United States Patent
Hyunh

(10) Patent No.: US 10,133,295 B2
(45) Date of Patent: Nov. 20, 2018

(54) FLIGHT CONTROL LOCKOUT DEVICE

(71) Applicant: The Boeing Company, Chicago, IL (US)

(72) Inventor: Tommy P. Hyunh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 14/968,647

(22) Filed: Dec. 14, 2015

(65) Prior Publication Data

US 2017/0166298 A1  Jun. 15, 2017

(51) Int. Cl.
*G05G 5/28* (2006.01)
*B64F 5/60* (2017.01)
*B64C 13/04* (2006.01)

(52) U.S. Cl.
CPC ........... *G05G 5/28* (2013.01); *B64C 13/0423* (2018.01); *B64F 5/60* (2017.01)

(58) Field of Classification Search
CPC . B64C 13/14; Y10T 70/5894; Y10T 70/5735; Y10T 70/565; Y10T 70/5757; Y10T 70/5774; Y10T 70/5841; Y10T 70/5889; Y10T 74/20666; G05G 5/28
See application file for complete search history.

(56) References Cited

U.S. PATENT DOCUMENTS

| | | | | |
|---|---|---|---|---|
| 3,330,504 A | * | 7/1967 | Lewis | B64C 13/14 244/224 |
| 3,898,823 A | * | 8/1975 | Ludeman | B64C 13/14 244/224 |
| 5,129,603 A | * | 7/1992 | Wippler | B64C 13/14 244/224 |
| 5,713,539 A | * | 2/1998 | Russ | B60R 25/0221 244/224 |
| 5,911,391 A | * | 6/1999 | Russ | B60R 25/0221 244/224 |
| 6,250,589 B1 | * | 6/2001 | Russ | B64C 13/14 244/1 R |
| 6,393,880 B1 | * | 5/2002 | Vance, Sr. | B64C 13/14 70/174 |
| 6,897,790 B2 | | 5/2005 | Orton | |
| 8,413,535 B2 | * | 4/2013 | Danielian | B60K 20/02 70/247 |
| 8,752,408 B2 | * | 6/2014 | Neiburger | B60T 7/042 70/201 |
| 2008/0092609 A1 | * | 4/2008 | Markbreit | B64C 13/14 70/254 |

* cited by examiner

*Primary Examiner* — Valentina Xavier
(74) *Attorney, Agent, or Firm* — Haynes and Boone, LLP

(57) ABSTRACT

Systems and methods are provided for a lockout device. The lockout device may prevent movement of aircraft control devices. The lockout device may include one or more portions and may include features that are designed to couple to or clasp a yoke of an aircraft as well as interface or couple to a pedal housing of the aircraft. Features of the lockout device may prevent movement of the aircraft control devices. The lockout device may include features to lock the device and may be multiple separate pieces or may be a hinged device.

20 Claims, 9 Drawing Sheets

FLIGHT CONTROL LOCKOUT DEVICE

TECHNICAL FIELD

The disclosure relates generally to lockout devices and more specifically to aircraft control system lockout devices.

BACKGROUND

In certain situations, it may be desirable to lock out certain aircraft control devices. For example, it may be desirable to lock out a yoke of an aircraft during servicing, testing, production, or other situations. During such situations, accidental actuation of the yoke may lead to undesired movement of aircraft control surfaces. Additionally, certain regulations, such as Federal Aviation Administration (FAA) regulations, may require that aircraft control devices be locked while testing and/or maintenance is performed on the aircraft.

SUMMARY

Systems and methods are disclosed herein for a lockout device in accordance with one or more embodiments. In certain examples, an apparatus may be provided. The apparatus may include a first end configured to clasp a yoke of an aircraft, a second end configured to couple to at least a portion of a cockpit of the aircraft, and a body connecting the first end and the second end such that the body may be configured to hold the yoke and the portion of the cockpit at a first fixed distance when the first end is clasped around the yoke and the second end is coupled to at least the portion of the cockpit.

In certain other examples, a further apparatus may be provided. Such an apparatus may include a first clamp portion comprising a first portion first end and a first portion second end such that the first portion first end includes a first opening and the first portion second end includes a first slot. The apparatus may also include a second clamp portion including a second portion first end and a second portion second end such that the second portion first end includes a second opening and the second portion second end includes a second slot. The first portion first end and the second portion first end of the apparatus may be configured to at least partially surround a yoke of an aircraft.

In additional examples, a method may be provided. The method may include forming and/or receiving a lockout device body, forming a first end of the body to clasp a yoke of an aircraft, and forming a second end of the body to couple to at least a portion of a cockpit of the aircraft such that the body is configured to hold the yoke and the portion of the cockpit at a first fixed distance when the first end is clasped around the yoke and the second end is coupled to at least the portion of the cockpit.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Lockout devices may be described in the disclosure herein in accordance with one or more embodiments. The lockout device described herein may lock out certain aircraft control devices and, thus, constrain or substantially constrain movement (e.g., constrain movement of more than approximately 0.5 inches, more than approximately 1 inch, approximately 2 inches, or approximately 2 inches or more) of the aircraft control devices. The lockout devices may include features to clasp the control device of an aircraft on one end and features to couple to a portion of a cockpit of the aircraft on another end.

Figure 1:
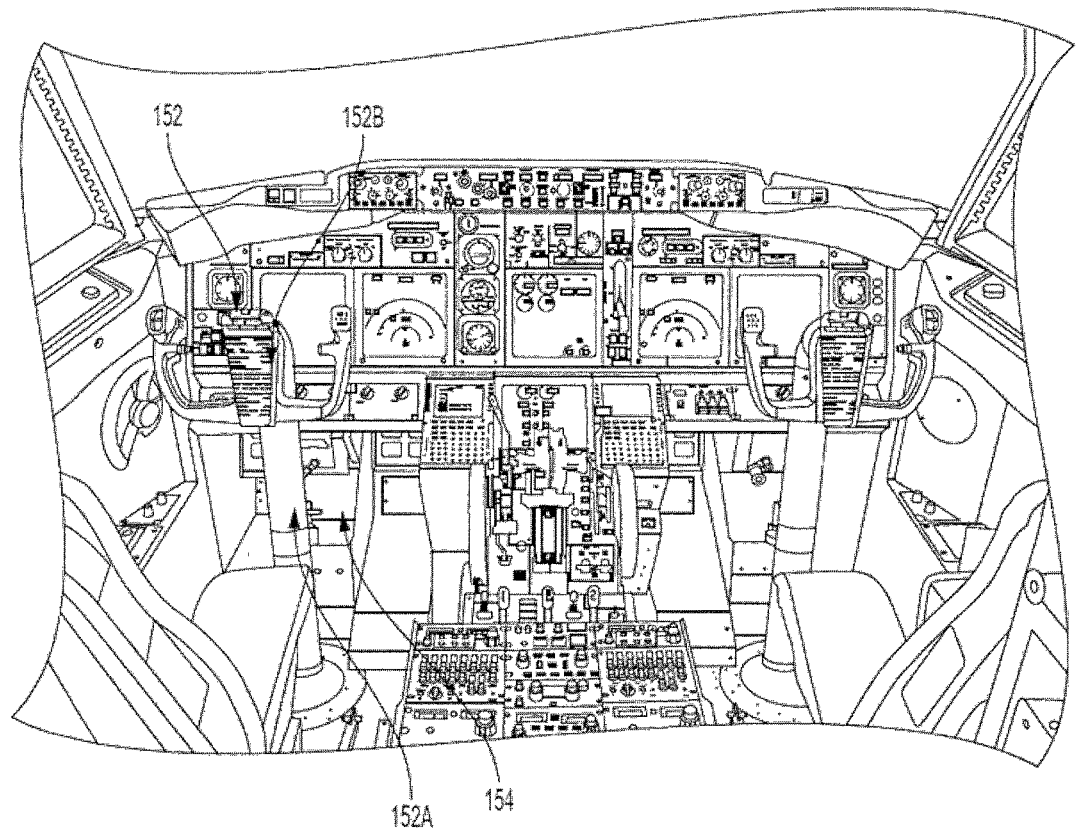
FIG. 1 illustrates a view of an aircraft cockpit in accordance with an example of the disclosure.

FIG. 1 illustrates a view of an aircraft cockpit in accordance with an example of the disclosure. The aircraft cockpit in FIG. 1 includes a yoke 152 and a rudder pedal assembly 154. The yoke 152 may include a yoke column 152A and a joystick 152B. In certain examples, the yoke column 152A may move with the joystick 152B. In such examples, the an end of the lockout device may couple to the yoke column 152A and/or the joystick 152B. In other examples, the yoke column 152A may be stationary while the joystick 152B may move. In such examples, an end of the lockout device may couple to the joystick 152B. Other examples may include other or additional features on the yoke 152 and in such examples, the lockout device may couple to one, some, all, or none of these additional features.

The rudder pedal assembly 154 may include one or more pedals and a pedal housing. In certain examples, the pedal housing of the rudder pedal assembly 154 may include one or more nooks, columns, ledges, stand-offs, depressions, handles, and/or other structural features that a lock-out device may grab onto. Such features may be, for example, included on the side of the pedal housing or a divider separating the rudder pedals. Certain examples of the lockout device may include an end with features configured to couple to the divider, while other examples may alternatively or additionally include features configured to couple to other portions of the pedal assembly 154, such as the side of the pedal housing. While the rudder pedal assembly 154 in FIG. 1 includes the divider separating the rudder pedals within the pedal housing, other embodiments may not include a divider separating the rudder pedals.

Figure 2:
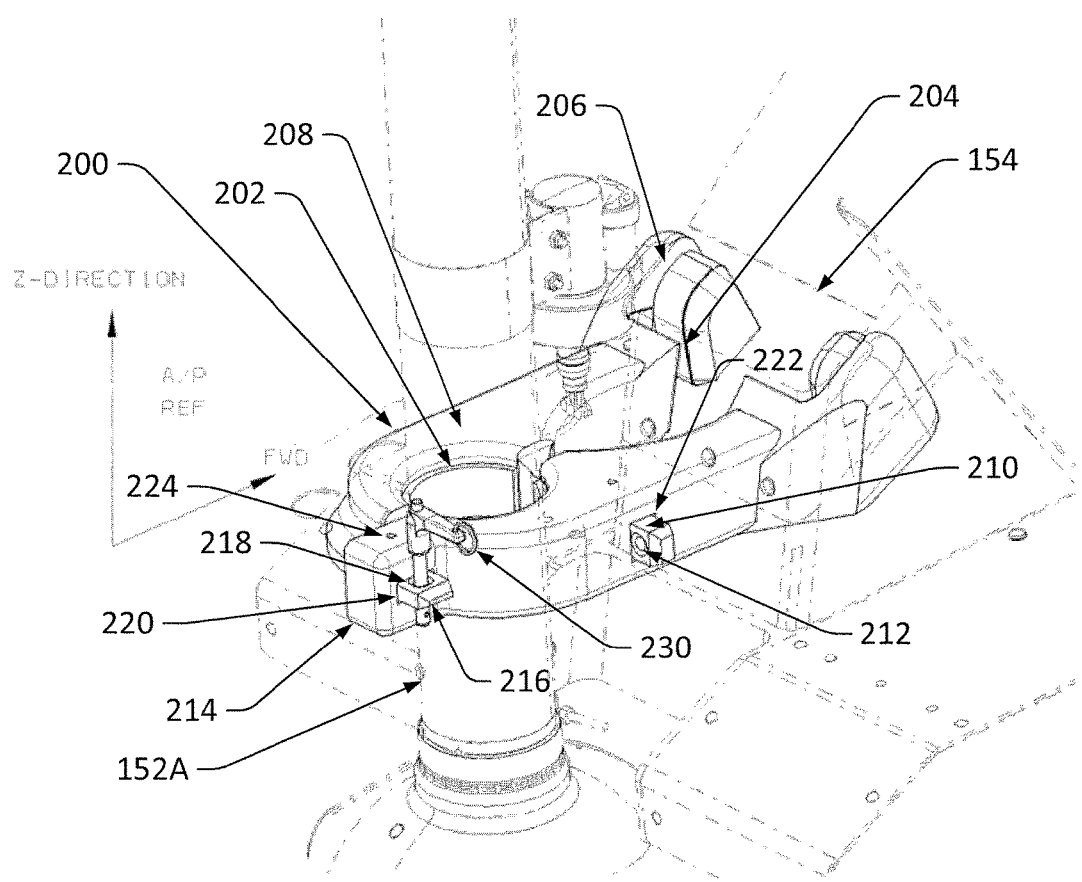
FIG. 2 illustrates a perspective view of a lockout device installed on an aircraft flight control system in accordance with an example of the disclosure.

FIG. 2 illustrates a perspective view of a lockout device installed on an aircraft flight control system in accordance with an example of the disclosure. FIG. 2 includes the yoke column 152A, the pedal assembly 154, and a lockout device 200. The lockout device 200 includes an opening 202, a slot 204, a cutout 206, a body 208, a locking mechanism aperture 222, a locking mechanism beam 210, a lock receiver 212, a front lock extension 214, a front lock beam 216, a front lock receiver 218, a front lock aperture 220, a through hole 224, and a locking pin 230. The yoke column 152A may be a yoke column that moves with the joystick 152B of a yoke 152. The pedal assembly 154 may include a pedal housing with a center divider.

The lockout device 200 may be a lockout device to constrain movement of a control device of the aircraft. The control device may be, for example, a yoke, a rudder pedal, a throttle, or another control device of the aircraft.

Movement of the control device or devices may be constrained through coupling the lockout device 200 to the control device, in addition to any other actions. The opening 202 of the lockout device 200 may, when the lockout device 200 is constraining movement of the control device, be coupled to the control device. For example, the opening 202 may clasp around the yoke column 152A, partially or fully surrounding the yoke column 152A. Though FIG. 2 shows that the opening 202 is a round opening that substantially matches the shape of the yoke column 152A, other embodiments may include openings of other geometric shapes such as squares, rectangles, triangles, hexagons, and other shapes. Such shapes need to be able to constrain movement of the yoke column 152A. In other examples, the opening 202 may couple to a rudder pedal, a throttle handle, or another control device.

The slot 204 may couple to a portion of the pedal assembly 154. The slot 204 may, for example, be configured so that it can clasp a ledge of the pedal assembly 154 or be coupled to another portion of the pedal assembly 154 and/or be coupled to the pedal assembly 154 in another manner. The cutout 206 may be a cutout of material from the body 208 and may couple to another portion of the pedal assembly 154. For example, the cutout 206 may, when the lockout device 200 is constraining movement of the control device, be located over or underneath a ledge or other feature of the pedal assembly 154. In certain examples, when the opening 202, the slot 204, and the cutout 206 are positioned in the respective positions that they are configured to be located at, for the lockout device 200 to constrain movement of the control device, they may constrain movement of the control device through contact. For example, the opening 202 may constrain movement along one or more axes or directions and the slot 204 may constrain movement along at least a further axis or direction. Additional features of the lockout device, such as the cutout 206, may constrain movement along additional axes or directions. By constraining movement of the control device through contact via the lockout device 200, the lockout device 200 may constrain movement of the control device (the yoke column 152A in this example) in any desired direction (e.g., in some examples, movement of the control device in any direction that would result in movement of aircraft control surfaces may be constrained, but the control device may still be free to move in a direction that doesn't result in movement of any aircraft control surfaces) or in all directions.

The body 208 may be the physical portion of the lockout device 200. The opening 202, the slot 204, and the cutout 206, may be void spaces within the body 208. The body 208 may be made from any combination of appropriate materials such as plastic, composites such as carbon fiber and fiberglass, steel, aluminum, titanium, wood, cardboard, copper, and/or other materials. The body 208 may be manufactured (e.g., molded, extruded, cast, stamped, 3D printed, laid-up, and/or produced through other appropriate techniques) and/or received from a facility producing the body 208. The body 208 may additionally receive secondary processing such as additionally stamping, machining, 3D printing, and/or any other appropriate techniques to form features on the body 208 such as the opening 202, the slot 204, and/or the cutout 206. As such, the opening 202, the slot 204, and/or the cutout 206 may be features that are produced (e.g., molded, extruded, cast, stamped, cut, machined, printed, laid-up, and/or produced through any other appropriate technique) on the body 208 during the primary and/or secondary production process of the lockout device 200. Such manufacturing and secondary processing may be referred to as "forming."

The locking mechanism aperture 222 may allow a locking mechanism beam 210 to pass through. The locking mechanism 222 and the locking mechanism beam 210 may be described as the center locking mechanism. The locking mechanism beam 210 may include a lock receiver 212. In certain examples, the lockout device 200 may be composed of two or more parts and a lock (not shown) may be coupled through the lock receiver 212 to constrain or substantially constrain movement (e.g., constrain movement of less than approximately 0.5 inches in any direction, movement of less than approximately 2 inches in any direction, movement of less than approximately 5 inches in any direction, and/or movement of less than another value sufficient to prevent movement of aircraft control surfaces) of the two or more parts relative to each other. Though the example lockout device 200 shown in FIG. 2 includes features for locks to couple to, other embodiments of the lockout device 200 may include built-in locks that, once one or more of such locks are engaged, prevent tampering with the lockout device 200 to move the yoke 152.

In certain examples, there may be an alternative or additional locking mechanism at one end of the lockout device 200 (e.g., near the end configured to couple to the yoke column 152A or near the end configured to couple to the pedal assembly 154). For example, the lockout device 200 features a front locking mechanism that includes the front lock extension 214. The front lock extension 214 may be an extension that may be a part of the body of one or more of the parts of the lockout device 200. The front lock extension 214 includes a front lock aperture 220 that may receive a front lock beam 216. The front lock beam 216 includes a front lock receiver 218 configured to receive a portion of a lock. The front lock receiver 218 may receive a lock to constrain or substantially constrain movement of at least some of the various parts of the lockout device 200. For example, when the locking pin 230 is inserted and/or locked into place within the front lock receiver 218, movement may be constrained. The front locking mechanism may be configured to lock the lockout device 200 in a similar manner to that of the locking mechanism aperture 222 and the locking mechanism beam 210. Certain examples may combine the center locking mechanism with the front locking mechanism to further prevent tampering of the lockout device 200.

Figure 3A:
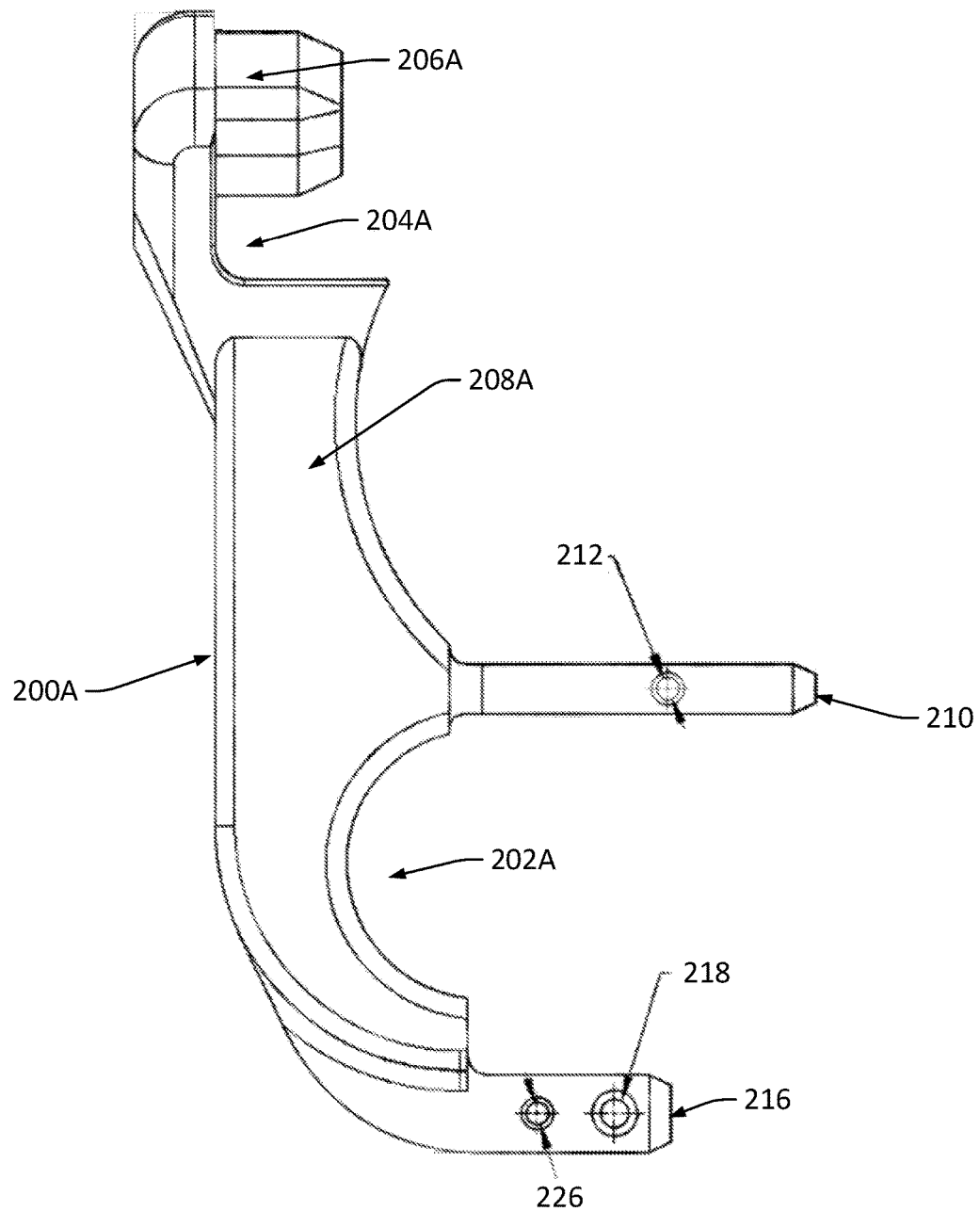
FIG. 3A illustrates a top view of a first portion of a lockout device in accordance with an example of the disclosure.

FIG. 3A illustrates a top view of a first portion of a lockout device in accordance with an example of the disclosure. In FIG. 3A, the lockout device 200 may be a multi-part lockout device. FIG. 3A illustrates a first portion 200A of the lockout device 200. The first portion 200A may be combined with the second portion 200B illustrated in FIGS. 4A and 4B to constitute the locking device 200.

In FIG. 3A, the first portion 200A includes a first portion body 208A. Features on the first portion body 208A include an opening 202A, a slot 204A, a cutout 206A, the locking mechanism beam 210 with the lock receiver 212, and the front lock beam 216 with the front lock receiver 218 and a through hole 226.

The opening 202A, the slot 204A, and the cutout 206A may be similar to the opening 202, the slot 204, and the cutout 206 or a portion thereof of the features as described in FIG. 2. For example, as the first portion 200A is only a portion of the lockout device 200 though, the opening 202A, the slot 204A, and/or the cutout 206A may form only a part of any mechanism configured to clasp and/or hold portions of the pedal assembly 154 and/or yoke 152. To further illustrate the example, the opening 202A is approximately only half a circular opening. As such, another part of the lockout device, such as a second portion 200B described in FIGS. 4A and 4B, may include an opening (e.g., an opening 202B) that is configured to line up with the opening 202A to form a full circular opening and clasp a yoke when the first portion 200A is coupled to the second portion 200B. Other examples may include portions where a full geometric opening is not formed (e.g., may only form three quarters of a circle), but may still fully constrain movement of the yoke. By contrast, the slot 204A and the cutout 206A are configured to individually receive separate portions of the pedal assembly 154. However, the second portion 200B may also include one or more slots and one or more cutouts that are configured to individually receive other parts of the pedal assembly 154. In such a configuration, the first portion 200A and the second portion 200B may not lock in place the yoke 152 and/or the pedal assembly 154 (e.g., hold or substantially hold the yoke 152 in a fixed spatial relationship to the pedal assembly 154) until the first portion 200A is coupled to the second portion 200B.

The locking mechanism beam 210, the lock receiver 212, the front lock beam 216, and the front lock receiver 218 may be similar to the respective components described in FIG. 2. As such, the locking mechanism beam 210 and the front lock beam 216 may be configured to be inserted into the locking mechanism aperture 222 and the front lock aperture 220, respectively. Additionally, the through hole 226 may, when the first portion 200A is coupled to the second portion 200B, line up with the through hole 224 of the second portion 200B and allow for an additional locking mechanism (e.g., a lock, safety wire, or other mechanism) to couple the first portion 200A to the second portion 200B.

Figure 3B:
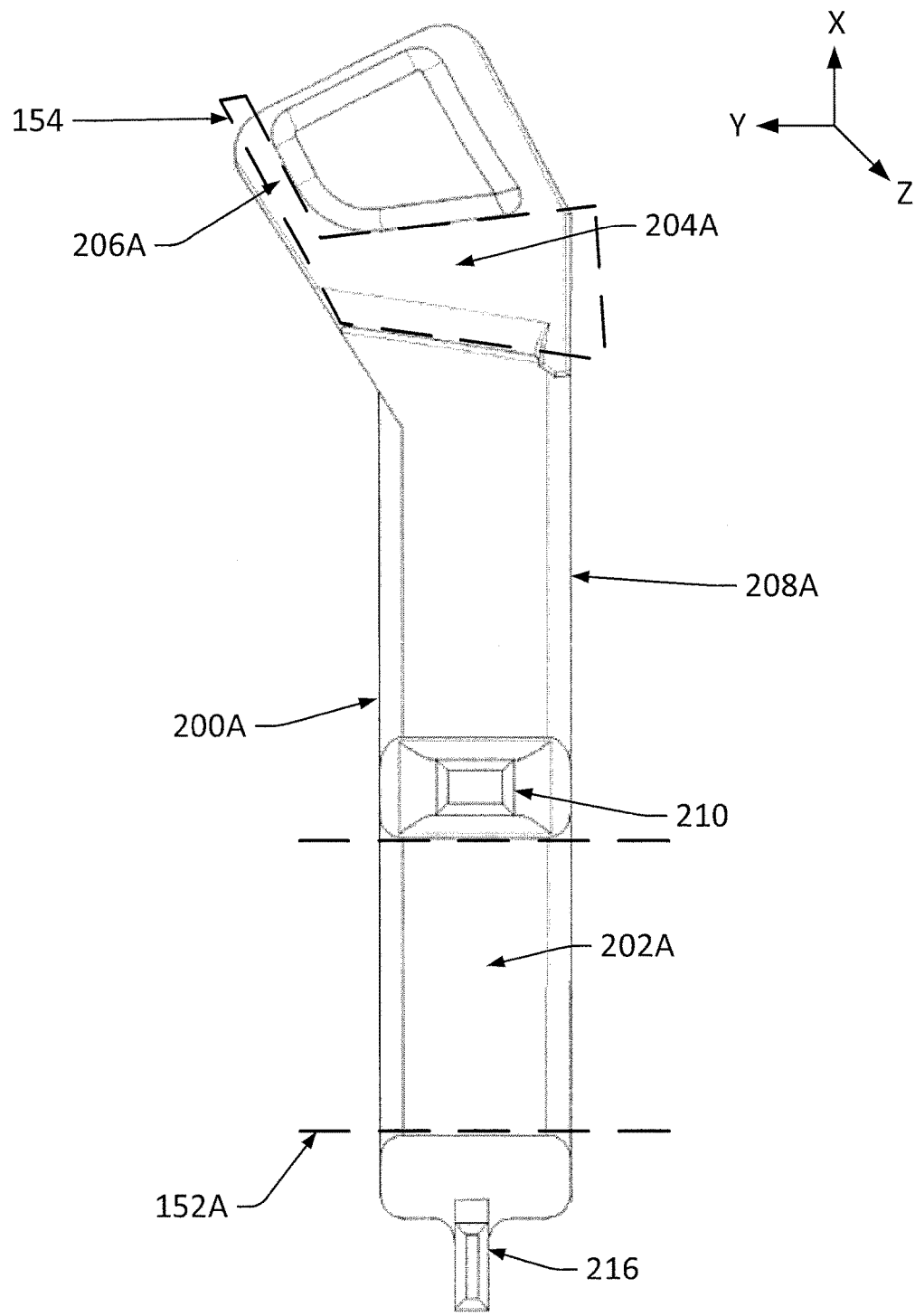
FIG. 3B illustrates a side view of the first portion of the lockout device of FIG. 3A in accordance with an example of the disclosure.

FIG. 3B illustrates a side view of the first portion of the lockout device of FIG. 3A in accordance with an example of the disclosure. Additionally, FIG. 3B illustrates outlines of the yoke column 152A and the pedal assembly 154. As shown in FIG. 3B, the opening 202A may clasp the yoke column 152A and the slot 204A and the cutout 206A may couple to parts of the pedal assembly 154. When the opening 202A is clasping the yoke column 152A and the slot 204A and the cutout 206A are coupled to parts of the pedal assembly 154, the yoke column 152A may be held in a fixed or substantially fixed relationship (e.g., constrained from movement of more than approximately 0.5 inches, more than approximately 1 inch, approximately 2 inches, or approximately 2 inches or more) to the pedal assembly 154. The yoke column 152A and the pedal assembly 154 may be held in a fixed or substantially fixed relationship due to contact between the opening 202A and the yoke column 152A as well as between the slot 204A and/or the cutout 206A with portions of the pedal assembly 154. For example, when movement of the yoke 152 is attempted (e.g., on purpose or through accidental contact of an item or person with any part of the yoke 152), the yoke 152 may contact a part of the opening 202A and/or a part of the opening 202B of the second portion 200B (not shown in FIGS. 3A and 3B, but shown in FIGS. 4A and 4B) and transfer a force to the lockout device 200. A part of the lockout device 200, such as one or more of the slots 204A-B and/or the cutouts 206A-B, may then contact a part of the pedal assembly 154. The slots 204A-B, the cutouts 206A-B, and/or other features of the lockout device 200 may be arranged in such a fashion that, when a part of the lockout device 200 contacts the pedal assembly 154, movement of the lockout device 200 may be constrained or substantially constrained. As such, the lockout device 200 may then constrain or substantially constrain movement of the yoke 152 (e.g., prevent or substantially prevent the yoke 152 from moving).

As shown in FIG. 3B, substantial movement of the lockout device 200 in the X and/or Y direction may result in the slot 204A and/or the cutout 206A contacting the pedal assembly 154. Such contact may constrain or substantially constrain movement of the lockout device 200 in the X and/or Y direction and, accordingly, constrain or substantially constrain movement of the yoke 152 in those directions. To constrain movement in multiple such directions, the slot 204A and the cutout 206A may be configured such that an axis of the slot 204A (e.g., an axis parallel with an edge of the slot 204A) may intersect an axis of the cutout 206A (e.g., an axis parallel with an edge of the cutout 206A). Additionally, other features of the lockout device 202, such as the walls of the slots 204A-B and/or the walls of the cutout 206A-B (e.g., the portions of the body 208 still remaining after the slots 204A-B and/or the cutout 206A-B have been formed) may, when the first portion 202A is coupled to the second portion 202B, constrain or substantially constrain movement of the lockout device 200 in the Z direction (e.g., the direction normal to the figure) and, accordingly, constrain or substantially constrain movement of the yoke 152 in the Z direction.

Figure 4A:
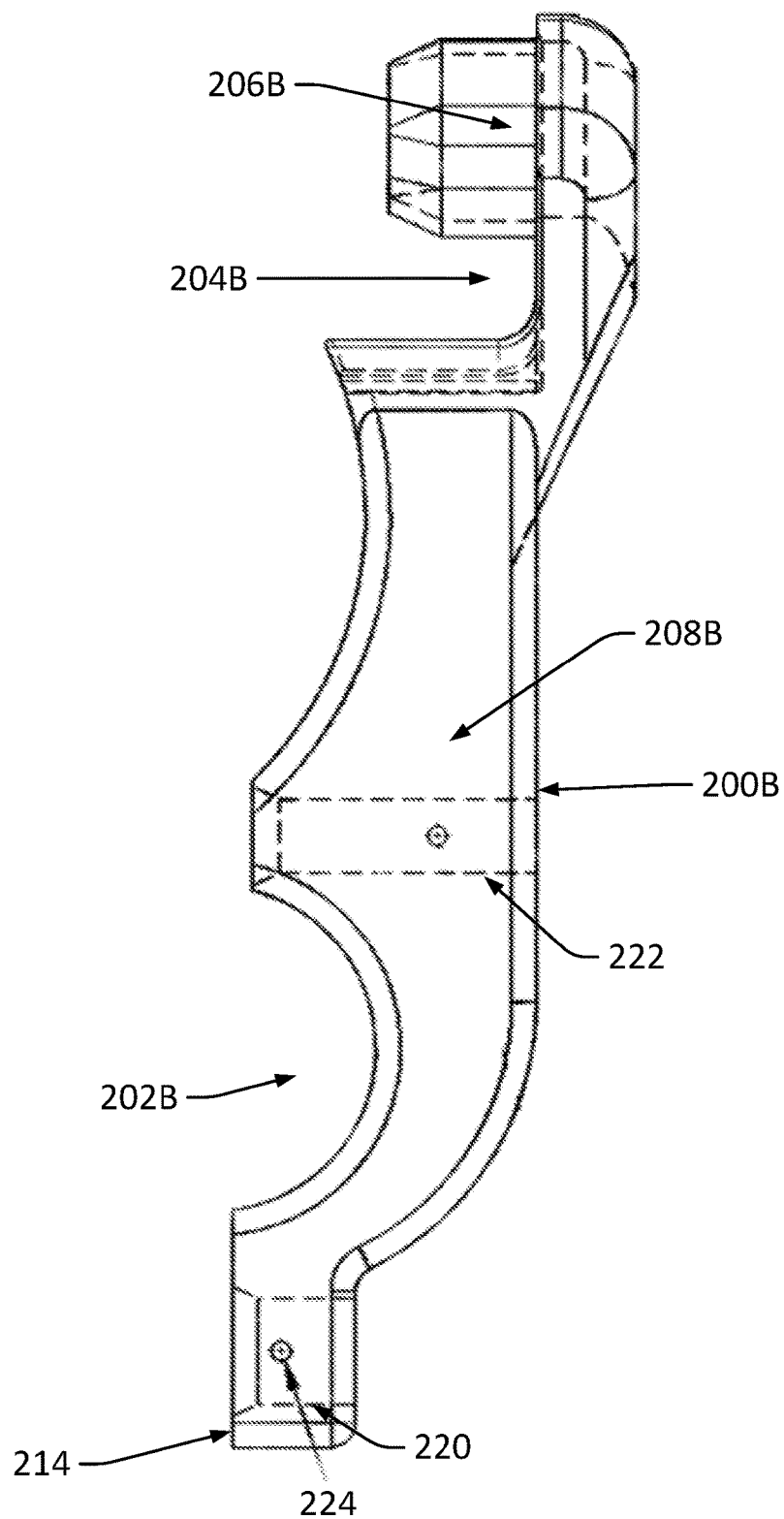
FIG. 4A illustrates a top view of a second portion of a lockout device in accordance with an example of the disclosure.
Figure 4B:
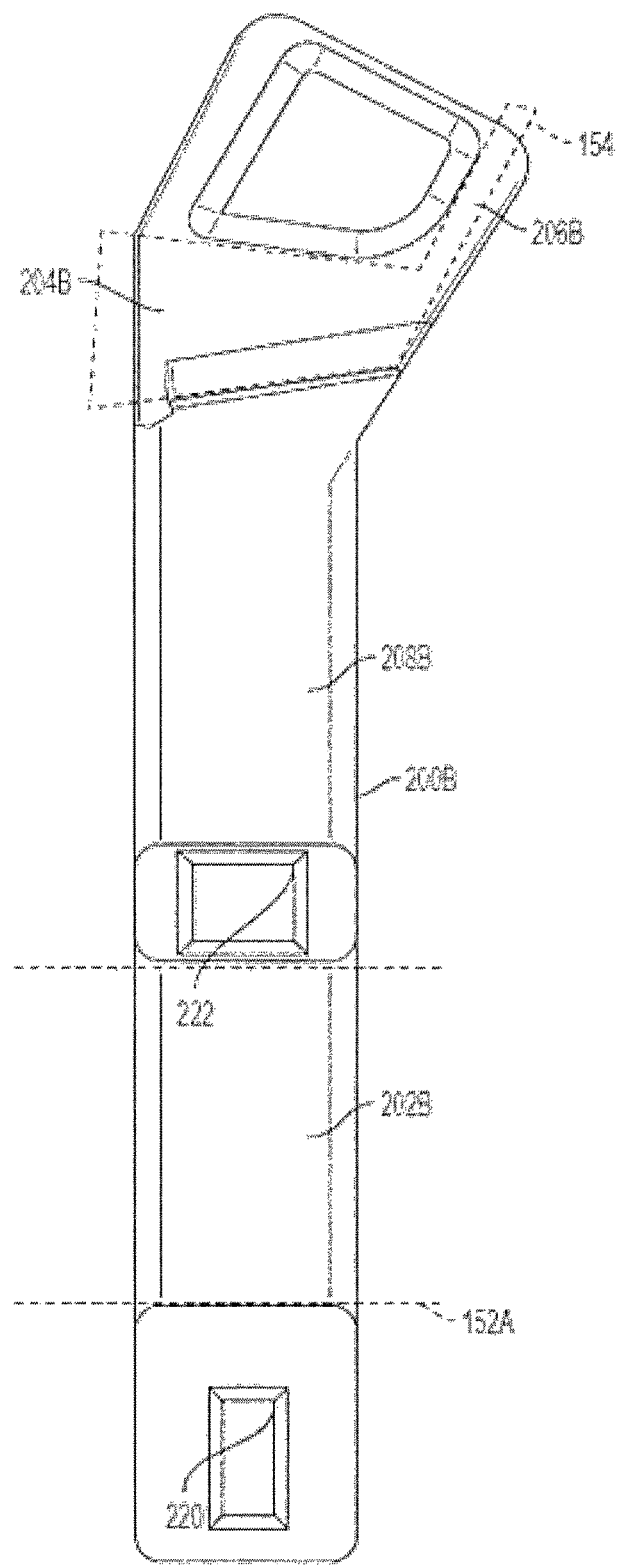
FIG. 4B illustrates a side view of the second portion of the lockout device of FIG. 4A in accordance with an example of the disclosure.

FIG. 4A illustrates a top view of a second portion of a lockout device in accordance with an example of the disclosure. FIG. 4B illustrates a side view of the second portion of the lockout device of FIG. 4A in accordance with an example of the disclosure. FIGS. 4A and 4B illustrate a second portion 200B of the lockout device 200. The second portion 200B includes the opening 202B, the slot 204B, the cutout 2063, the locking mechanism aperture 222, the front lock extension 214 with the front lock aperture 220 and the through hole 224.

The second portion 200B may be configured to be coupled to the first portion 200A to form the lockout device 200. The opening 2023, the slot 204B, and the cutout 206B may be configured to couple to and/or clasp the yoke 152 and/or the pedal assembly 154 similar to the opening 202A, the slot 204A, and the cutout 206A. However, the opening 202B, the slot 204B, and the cutout 206B may be dimensionally different from the respective opening, slot, and cutout shown in FIGS. 3A and 3B. In certain examples, the opening 202A and the opening 202B, when combined, may surround, clasp, or couple to the yoke 152 (shown in FIG. 4B). The slot 204B and the cutout 206B may couple to portions of the pedal assembly 154.

The yoke column 152A and the pedal assembly 154 may be held in a fixed or substantially fixed relationship due to contact between the opening 202A and/or the opening 202B and the yoke column 152A as well as between the slots 204A/B and/or the cutouts 206A/B with portions of the pedal assembly 154.

Figure 5:
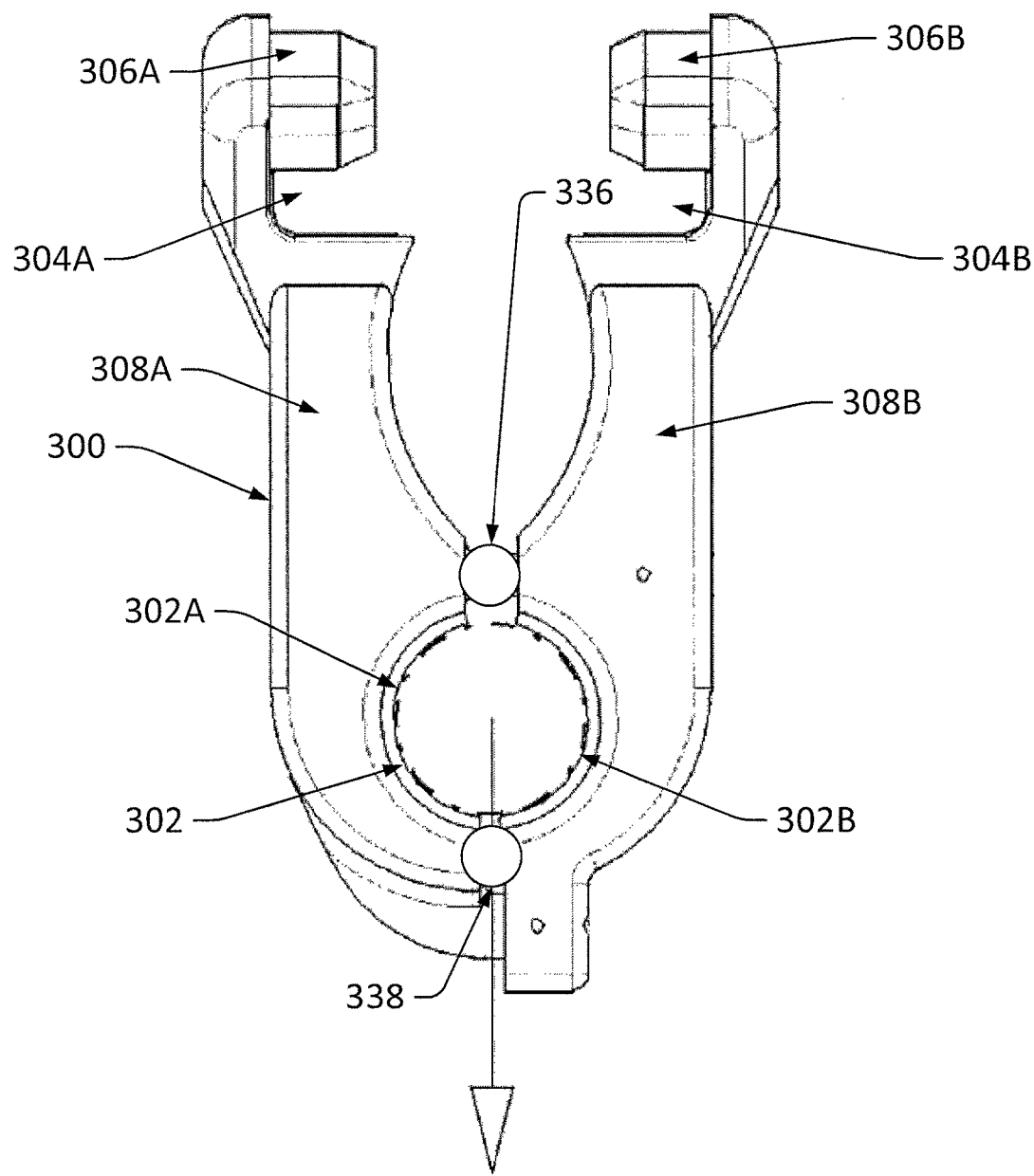
FIG. 5 illustrates a top view of a lockout device in accordance with an example of the disclosure.

FIG. 5 illustrates a top view of a lockout device in accordance with an example of the disclosure. The lockout device 300 shown in FIG. 5 may be, in certain examples, a hinged lockout device. The hinged lockout device 300 may be constituted by two or more pieces linked together. As such, the hinged lockout device 300 may include first and second portions 308A and 308B. The first and second portions 308A and 308B may include features similar to that of the first and second portions 208A and 208B of the lockout device 200, such as the openings, slots, and/or cutouts.

The first and second portions 308A and 308B of the lockout device 300 may be coupled through one or more hinges. The hinge 226 may be such a hinge. The hinge 226 may hinge the first and second portions 308A and 308B near the middle of the two bodies. In such an example with a central hinge 226, the first and second portions 308A and 308B may, instead of being bodies located on alternate sides, be crossed bodies so that bodies may form a scissoring action when they are opened.

In other examples, the first and second portions 308A and 308B may be hinged near an end of the first and second portions 308A and 308B. Such an example may be hinged by, for example, the hinge 228. The hinge 228 may be a hinge located at the front of the first and second portions 308A and 308B. The first and second portions 308A and 308B may then open to receive the yoke 152 and/or be positioned around the pedal assembly 154.

The hinged lockout device 300 may open to receive the yoke 152 before closing around the yoke 152. The hinged lockout device 300 may include one or more locks or one or more features configured to receive locks. Accordingly, the hinged lockout device 300 may be locked when the locks are received. For example, after the hinged lockout device 300 has been closed around the poke 152 and positioned to couple to the portions of the pedal assembly 154, the hinged lockout device 300 may then be locked to prevent tampering with the hinged lockout device 300.

Figure 6A:
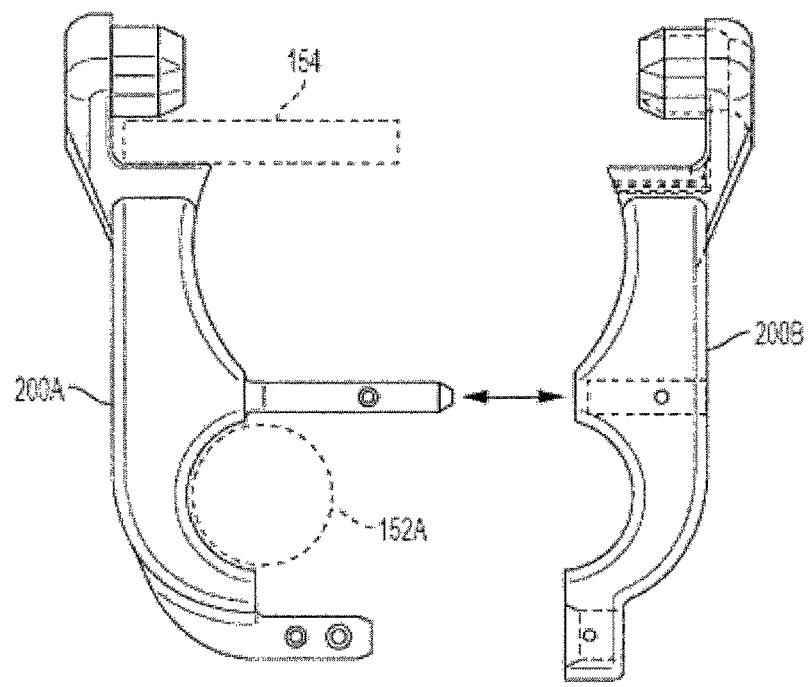
FIGS. 6A and 6B illustrate a sequence of assembling a lockout device in accordance with an example of the disclosure.
Figure 6B:
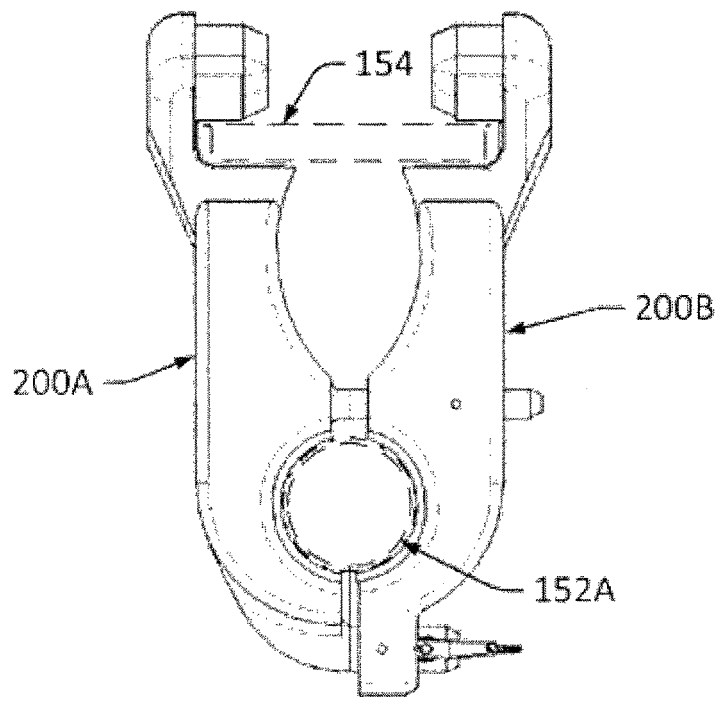

FIGS. 6A and 6B illustrate a sequence of assembling a lockout device in accordance with an example of the disclosure. The lockout device 200 in FIGS. 6A and 6B may be a two piece lockout device as shown in FIGS. 2-4B.

In FIG. 6A, the first portion 200A may be positioned so that the slots and/or cutouts of the first portion 200A are positioned next to the portions of the pedal assembly 154 that the slots and/or cutouts of the first portion 200A are configured to couple to. Additionally, the opening of the first portion 200A may be positioned next to the yoke column 152A.

After the first portion 200A has been positioned, the second portion 200B may then be coupled to the first portion 200A. When coupling the second portion 200B to the first portion 200A, the slots and/or cutouts of the second portion 200B are positioned next to the portions of the pedal assembly 154 that the slots and/or cutouts of the second portion 200B are configured to couple to. Additionally, the opening of the second portion 200B may be positioned next to the yoke column 152A. The first portion 200A and the second portion 200B may then be brought together and coupled, as shown in FIG. 6B.

Afterwards, the locking mechanism aperture 222 may receive the locking mechanism beam 210. A lock may be then inserted into the lock receiver 212. Also, the front lock aperture 220 may receive the front lock beam 216 and locked into place as well.

Figure 7:
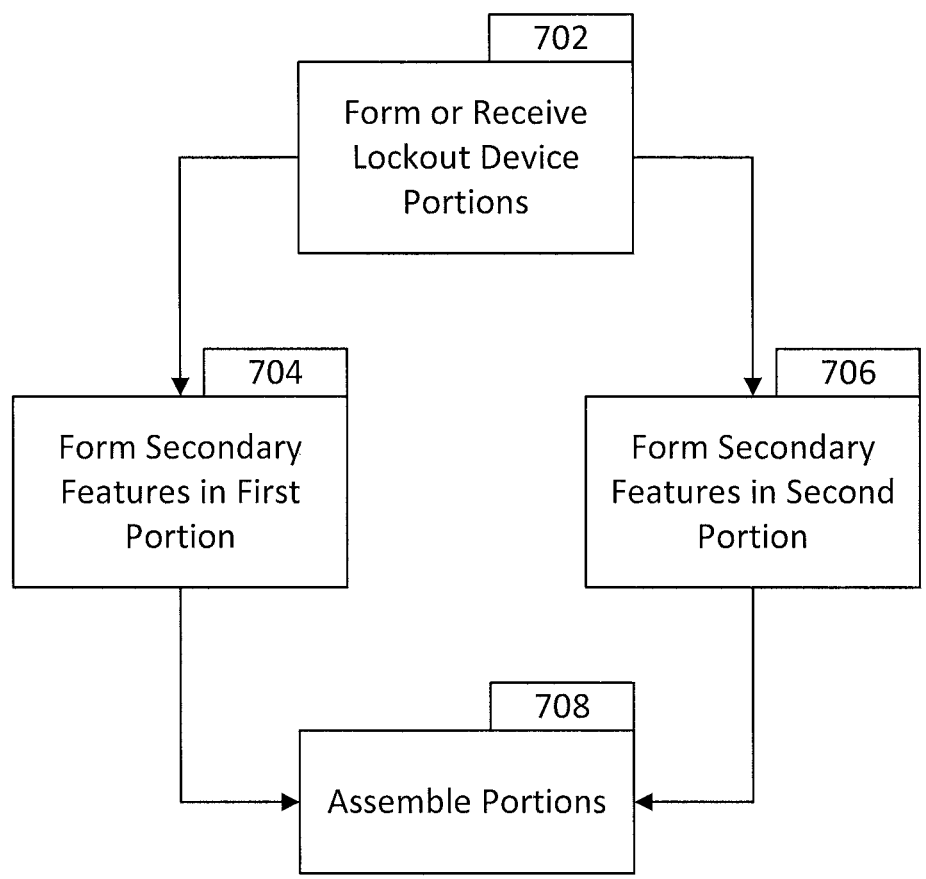
FIG. 7 is a flowchart illustrating a process of manufacturing a lockout device in accordance with an example of the disclosure.

FIG. 7 is a flowchart illustrating a process of manufacturing a lockout device in accordance with an example of the disclosure. In block 702, the base body of one or more portions of the lockout device may be manufactured (e.g., molded, cast, stamped, 3D printed, laid-up, and/or produced through other appropriate techniques) and/or received from a facility producing the base body (e.g., the body may be cast at a first facility and then shipped to a second facility for processing of secondary features).

In blocks 704 and 706, the first and second portions of the lockout device may additionally receive secondary processing such as additionally stamping, machining, 3D printing, and/or any other appropriate techniques to form features on the first and/or second portions such as openings, slots, cutouts, and/or other features. Additionally, if one or more of the first and/or second portions includes a built in lock, such items may be assembled to the respective portions in blocks 704 and/or 706, or assembled in block 708. In certain other examples, additional portions, such as a third portion, of the lockout device may also receive additional secondary processing.

In block 708, the various portions and other parts of the lockout device may be assembled. The first and second portions may be assembled to each other, or, if they are configured to be shipped as separate pieces, may be held separate. A hinged lockout device may couple the portions to the hinge. Any additional features such as locks may also be assembled in this step.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
a first end configured to clasp a yoke of an aircraft;
a second end configured to couple to at least a fixed portion of a rudder pedal assembly of the aircraft, the second end comprising a first feature and a second feature, wherein the first feature and the second feature are configured to dispose at least a part of the fixed portion between the first feature and the second feature; and
a body connecting the first end and the second end, wherein the body is configured to hold the yoke and the fixed portion at a first fixed distance when the first end is clasped around the yoke and the second end is coupled to at least the fixed portion of the rudder pedal assembly.

2. The apparatus of claim 1, wherein the fixed portion is at least a portion of a pedal housing of the rudder pedal assembly distinct from one or more moveable pedals of the rudder pedal assembly.

3. The apparatus of claim 2, wherein the second end comprises at least one slot configured to couple to at least the portion of the pedal housing of the aircraft.

4. The apparatus of claim 2, wherein the first feature is configured to couple to a first side of the pedal housing and the second feature is configured to couple to a second side of the pedal housing.

5. The apparatus of claim 4, wherein the second end and/or the body is configured to hold the first feature and the second feature at a second fixed distance when the first end is clasped around the yoke, the first feature is coupled to the first side of the pedal housing, and the second feature is coupled to the second side of the pedal housing.

6. The apparatus of claim 1, wherein the apparatus comprises a first portion and a second portion configured to be coupled to the first portion and further comprising a locking feature configured to lock the first portion to the second portion.

7. The apparatus of claim 1, wherein the first end comprises an opening configured to clasp the yoke of the aircraft.

8. A method of making the apparatus of claim 1, the method comprising:
forming and/or receiving the body;
forming the first end; and
forming the second end.

9. An apparatus comprising:
a first clamp portion comprising a first portion first end and a first portion second end, wherein:
the first portion first end comprises a first opening, and
the first portion second end comprises a first slot; and
a second clamp portion comprising a second portion first end and a second portion second end, wherein:
the second portion first end comprises a second opening,
the second portion second end comprises a second slot;
the first portion first end and the second portion first end are configured to at least partially surround a yoke of an aircraft; and
the first portion second end is configured to couple to at least a first fixed portion of a rudder pedal assembly of the aircraft and the second portion second end is configured to couple to at least a second fixed portion of the rudder pedal assembly to hold the first and second fixed portions and the yoke at first and second fixed distances, respectively, when the first portion first end and the second portion first end at least partially surround the yoke.

10. The apparatus of claim 9, further comprising:
a first portion body disposed between the first portion first end and the first portion second end;
a beam disposed on the first portion body;
a second portion body disposed between the second portion first end and the second portion second end; and
an aperture disposed on the second portion body, wherein the aperture is configured to receive the beam.

11. The apparatus of claim 10, wherein the beam further comprises a beam aperture configured to receive a lock.

12. The apparatus of claim 10, wherein the beam and/or the aperture further comprises a locking mechanism configured to hold the first clamp portion in a substantially fixed relation to the second clamp portion.

13. The apparatus of claim 9, wherein the first slot comprises a first surface and a second surface and wherein the first portion second end further comprises a third surface disposed at an angle to the first surface and/or the second surface.

14. The apparatus of claim 9, wherein the first fixed portion and the second fixed portion are portions of a pedal housing of the rudder pedal assembly.

15. The apparatus of claim 9, wherein the first clamp portion and the second clamp portion are hinged.

16. The apparatus of claim 9, wherein at least one of the first portion second end and the second portion second end comprise a cutout such that an axis of the first slot and an axis of the cutout are intersecting.

17. A method of using the apparatus of claim 9, comprising:
receiving the first clamp portion;
positioning the first clamp portion such that the first portion first end is proximate to the yoke and the first portion second end is proximate to the first fixed portion;
positioning the second clamp portion such that the second portion first end is proximate to the yoke and the second portion second end is proximate to the second fixed portion; and
coupling the first clamp portion and the second clamp portion.

18. The method of claim 17, wherein coupling the first clamp portion and the second clamp portion comprises inserting a beam disposed on a first portion body of the first clamp portion into an aperture disposed on a second portion body of the second clamp portion.

19. The method of claim 18, wherein coupling the first clamp portion and the second clamp portion further comprises engaging a lock to hold the first clamp portion in a substantially fixed relation to the second clamp portion.

20. The method of claim 17, wherein the first fixed portion and the second fixed portion are portions of a pedal housing of the rudder pedal assembly.

* * * * *